UNITED STATES PATENT OFFICE.

HERBERT O. CARY, OF DE KALB, ILLINOIS, ASSIGNOR TO THE I. L. ELLWOOD MANUFACTURING COMPANY, OF SAME PLACE.

COATED METALLIC ARTICLE.

SPECIFICATION forming part of Letters Patent No. 612,190, dated October 11, 1898.

Application filed August 16, 1897. Serial No. 648,384. (No model.)

*To all whom it may concern:*

Be it known that I, HERBERT O. CARY, of De Kalb, Illinois, have invented a certain new and useful Improvement in Coated Metallic Articles, of which the following is a specification.

This invention relates to coated metallic articles—such as nails, screws, bolts, staples, railway and other spikes, or other metallic articles which are used in contact with wood—and has for its object to provide a coating for such articles, which will preserve them from decay and increase their tenacity.

To these ends my invention consists in certain novel features, which will be hereinafter described, and then pointed out in the claim.

In carrying out my invention I apply to the nail or other article a coating the principal ingredient of which is lime, the same being always used in conjunction with rubber in proper proportions, and in addition to these elements a protective solution is employed, applied either separately after the lime and rubber have been applied or along with said lime and rubber.

In carrying out my invention in its preferred form I dissolve pure rubber in benzin and then place the lime, dry-slaked, in this solution of rubber. The article to be coated is then dipped in this mixture. The protective solution is preferably composed of the following ingredients: linseed-oil, three gallons; black oxid of manganese, ten pounds; Carolina gum, one hundred pounds; Cuban asphaltum, fifty pounds; French or German candle-gum, one hundred pounds. The linseed-oil is placed in a kettle, the other ingredients stirred in, and the whole subjected to heat for about three hours and a half and reduced to the desired consistency by the addition of 63° deodorized naphtha. The article to be coated, after being dipped in the rubber-and-lime solution, is dipped in the protective solution when this latter is cold, and the coating is then complete.

The above description embodies the preferred method of coating the article or articles. Various modifications thereof may be made. For instance, the article to be coated may be first dipped in a solution of lime and then in a solution of rubber. The rubber-and-lime solution may be added directly to the protective solution and the coating effected by dipping the article in this mixture. The protective solution may be of modified composition and the proportion of its ingredients may be varied. For instance, Trinidad asphaltum and varnish gums may be substituted for the asphaltum and gums specified.

An article coated as described has many advantages. The lime neutralizes any acids which may be left in the metal by reason of their process of manufacture. The coated article is protected from decay by reason of its being protected from moisture and the elements. Articles of this kind in close contact with wood are subject to the action of moisture, which is absorbed by the wood and conveyed to the metal, so that the latter are caused to deteriorate and become loosened. The coating described forms an impervious wall between the metal and the wood and preserves the articles from such injury at the surfaces of contact. Moreover, the coating, which has considerable elasticity, becomes compressed between the wood and the article, and by reason of its adhesion to both of them serves to firmly and securely connect the two, so that the article is practically glued into place. In addition to the advantage of a firmer hold this feature also permits the use of a lighter nail or other article which will take the place and do the work of a heavier uncoated article of like nature, thus effecting a material saving in cost.

I claim—

A nail or other article of the character described, coated with lime and rubber and a protective solution, substantially as set forth.

HERBERT O. CARY.

Witnesses:
ARTHUR W. SPRAGUE,
HIRAM A. PARKS.